United States Patent
Balasubramanian et al.

(10) Patent No.: US 9,606,783 B2
(45) Date of Patent: Mar. 28, 2017

(54) DYNAMIC CODE SELECTION BASED ON DATA POLICIES

(71) Applicant: International Business Machines Corporation, Armonk, NY (US)

(72) Inventors: Swaminathan Balasubramanian, Troy, MI (US); Radha M. De, West Bengal (IN); Brian M. O'Connell, Cary, NC (US); Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 14/052,799

(22) Filed: Oct. 14, 2013

(65) Prior Publication Data

US 2015/0106797 A1   Apr. 16, 2015

(51) Int. Cl.
G06F 9/45 (2006.01)
G06F 9/445 (2006.01)

(52) U.S. Cl.
CPC ............ *G06F 8/4432* (2013.01); *G06F 8/443* (2013.01); *G06F 9/44536* (2013.01); *Y02B 60/181* (2013.01)

(58) Field of Classification Search
CPC ........................................ G06F 8/443–8/4441
USPC .................................................. 717/151–159
See application file for complete search history.

(56) References Cited

U.S. PATENT DOCUMENTS

| | | | | |
|---|---|---|---|---|
| 4,961,141 A | * | 10/1990 | Hopkins | G06F 8/441 717/151 |
| 5,815,720 A | * | 9/1998 | Buzbee | 717/158 |
| 5,857,106 A | * | 1/1999 | Barbour | G06F 9/44547 717/138 |
| 6,253,370 B1 | * | 6/2001 | Abadi et al. | 717/154 |
| 6,263,429 B1 | * | 7/2001 | Siska | G06F 8/4436 712/210 |
| 6,427,234 B1 | * | 7/2002 | Chambers | G06F 9/45516 717/140 |
| 6,654,953 B1 | * | 11/2003 | Beaumont et al. | 717/158 |
| 6,728,954 B1 | * | 4/2004 | Kesselman et al. | 717/154 |
| 6,988,263 B1 | * | 1/2006 | Hussain | G06F 11/323 714/E11.181 |
| 7,000,227 B1 | * | 2/2006 | Henry | G06F 8/443 717/146 |
| 7,437,438 B2 | | 10/2008 | Mogul et al. | |
| 7,478,031 B2 | * | 1/2009 | Master et al. | 703/22 |
| 7,657,881 B2 | * | 2/2010 | Nagendra | G06F 9/45516 717/136 |

(Continued)

FOREIGN PATENT DOCUMENTS

WO   2005043362 A2   5/2005

OTHER PUBLICATIONS

Richard Murphy, "Advanced Architectures and Execution Models to Support Green Computing", Computing in Science & Engineering, pp. 38-47, Nov.-Dec. 2010, Saudia National Laboratories, Thomas Sterling and Chirag Dekate, Louisiana State University.

*Primary Examiner* — Jason Mitchell (74) *Attorney, Agent, or Firm* — Edward J. Wixted, III (57) ABSTRACT

In a method for dynamically replacing code within a software application on a device, an annotated code segment that performs a function according to a first data policy is received. The computer determines an alternate segment that performs the function according to a second data policy.

18 Claims, 4 Drawing Sheets

(56) References Cited

U.S. PATENT DOCUMENTS

| | | | |
|---|---|---|---|
| 7,788,657 B2* | 8/2010 | Wannamaker et al. ....... 717/158 |
| 7,793,120 B2 | 9/2010 | McGrane et al. |
| 7,827,543 B1* | 11/2010 | Kosche et al. ................ 717/158 |
| 8,051,099 B2 | 11/2011 | Hamilton, II et al. |
| 8,281,294 B1* | 10/2012 | Vanderspek ............ G06F 8/447 |
| | | | 717/143 |
| 8,386,086 B2 | 2/2013 | Roux et al. |
| 8,453,128 B2* | 5/2013 | Daynes ............... G06F 9/45516 |
| | | | 717/140 |
| 2002/0103992 A1* | 8/2002 | Perry et al. ................... 712/229 |
| 2003/0046673 A1* | 3/2003 | Copeland ................ G06F 8/443 |
| | | | 717/163 |
| 2003/0093780 A1* | 5/2003 | Freudenberger ........ G06F 8/443 |
| | | | 717/153 |
| 2005/0114849 A1* | 5/2005 | Megiddo ....................... 717/151 |
| 2005/0138057 A1* | 6/2005 | Bender ................ G06F 9/4443 |
| 2006/0005177 A1* | 1/2006 | Atkin ........................ G06F 8/73 |
| | | | 717/151 |
| 2007/0033581 A1* | 2/2007 | Tomlin et al. ................ 717/154 |
| 2007/0226722 A1* | 9/2007 | Chou .................. G06F 9/44536 |
| | | | 717/158 |
| 2007/0300214 A1* | 12/2007 | Chang et al. ................. 717/153 |
| 2008/0127154 A1* | 5/2008 | Drepper .............. G06F 9/45525 |
| | | | 717/162 |
| 2008/0201179 A1* | 8/2008 | Maes ............................... 705/7 |
| 2009/0070752 A1* | 3/2009 | Alpern ...................... G06F 8/63 |
| | | | 717/148 |
| 2009/0113387 A1* | 4/2009 | Ziegler .................... G06F 8/30 |
| | | | 717/109 |
| 2009/0276649 A1* | 11/2009 | Hamilton, II ......... G06F 1/3203 |
| | | | 713/320 |
| 2009/0282410 A1* | 11/2009 | Moir ...................... G06F 9/467 |
| | | | 718/101 |
| 2010/0050156 A1* | 2/2010 | Bonanno ................ G06F 8/443 |
| | | | 717/122 |
| 2010/0223595 A1* | 9/2010 | Mateescu .................. G06F 8/33 |
| | | | 717/107 |
| 2010/0262779 A1* | 10/2010 | Potkonjak ..................... 711/118 |
| 2011/0276954 A1* | 11/2011 | Fontenot ................... G06F 8/47 |
| | | | 717/151 |
| 2012/0254851 A1 | 10/2012 | Diab |
| 2012/0272224 A1* | 10/2012 | Brackman ........... G06F 9/44521 |
| | | | 717/151 |
| 2012/0277921 A1 | 11/2012 | Shaffer et al. |
| 2013/0073883 A1 | 3/2013 | Vick et al. |
| 2013/0080805 A1* | 3/2013 | Vick et al. ..................... 713/320 |
| 2013/0185697 A1* | 7/2013 | Farchi et al. ................. 717/113 |
| 2013/0198729 A1* | 8/2013 | Turner et al. ................. 717/151 |
| 2014/0165029 A1* | 6/2014 | Balasubramanian et al. ............................ 717/110 |
| 2016/0026968 A1* | 1/2016 | Fan .................... G06F 17/30386 |
| | | | 707/769 |

* cited by examiner

DYNAMIC CODE SELECTION BASED ON DATA POLICIES

FIELD OF THE INVENTION

The present invention relates generally to the field of energy management, and more particularly to dynamically replacing code to match an energy policy on a device.

BACKGROUND OF THE INVENTION

A data policy may specify the data structure for in-memory representation of data, and the read/write scheme for data retrieval. A data policy may specify factors such as whether to prefetch data, reliance on indexes, reliance on memory cache, level of computing power, among other factors.

A data structure is a particular way of storing and organizing data in a computer so that it can be used efficiently. Data structures are generally based on the ability of a computer to fetch and store data at any place in its memory. The type of data structure used (e.g., array, hash table, graph, etc.) is typically selected to maximize efficiency. The type of data structure that will maximize efficiency depends on the application and function that uses the data structure.

An annotation is a special form of syntactic metadata that can be added to the source code of software, particularly within Java source code. Classes, methods, variables, parameters and packages may be annotated. Annotations can influence the run-time behavior of an application.

SUMMARY

Aspects of an embodiment of the present invention disclose a method, computer program product, and computing system for dynamically replacing code within a software application on a device. An annotated code segment that performs a function according to a first data policy is received. The computer determines an alternate segment that performs the function according to a second data policy.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. The term "computer-readable storage medium" does not encompass signal propagation media such as a copper cable, optical fiber or wireless transmission media.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

Figure 1:
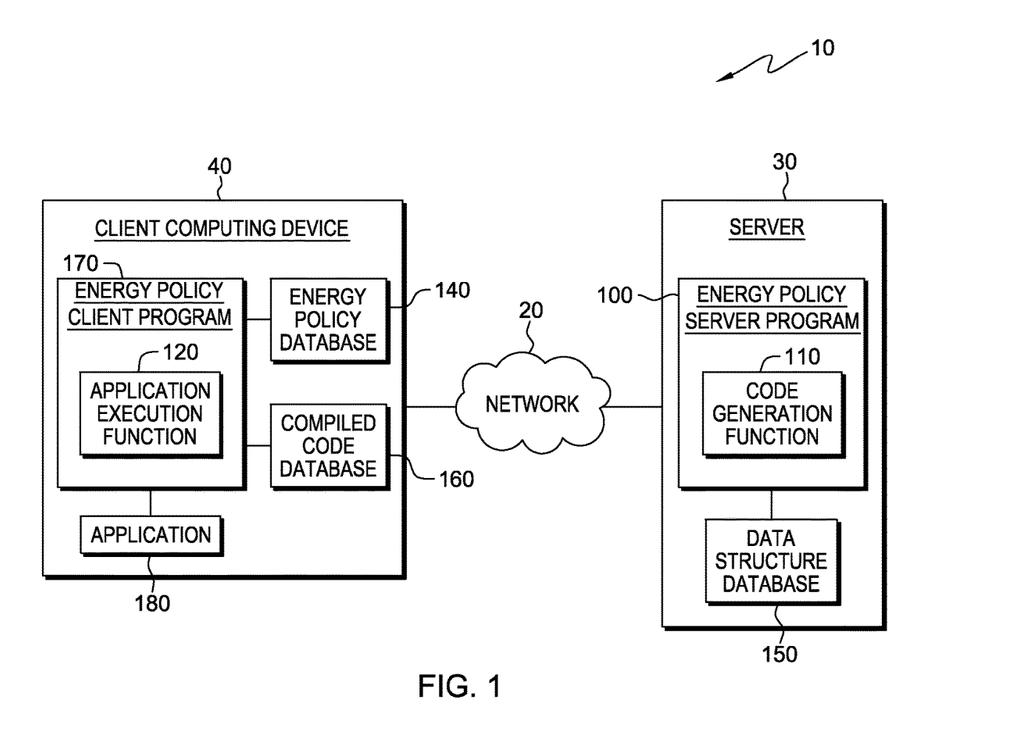
FIG. 1 depicts a diagram of a computing system in accordance with one embodiment of the present invention.

FIG. 1 depicts a diagram of computing system 10 in accordance with one embodiment of the present invention. FIG. 1 provides only an illustration of one embodiment and does not imply any limitations with regard to the environments in which different embodiments may be implemented.

In the depicted embodiment, computing system 10 includes server 30 and client computing device 40 interconnected over network 20. Network 20 may be a local area network (LAN), a wide area network (WAN) such as the Internet, any combination thereof, or any combination of connections and protocols that will support communications between server 30 and client computing device 40 in accordance with embodiments of the invention. Network 20 may include wired, wireless, or fiber optic connections. Computing system 10 may include additional computing devices, servers, computers, or other devices not shown.

Server 30 may be a management server, a web server, or any other electronic device or computing system capable of receiving and sending data. In some embodiments, server 30 may be a laptop computer, tablet computer, netbook computer, personal computer (PC), a desktop computer, a personal digital assistant (PDA), a smart phone, or any programmable electronic device capable of communicating with client computing device 40 via network 20. In other embodiments, server 30 may represent a server computing system utilizing multiple computers as a server system, such as in a cloud computing environment. Server 30 contains energy policy server program 100, code generation function 110, and data structure database 150. Server 30 may include components, as depicted and described in further detail with respect to FIG. 4.

Client computing device 40 may be a desktop computer, laptop computer, netbook computer, tablet computer, personal digital assistant (PDA), or smart phone. In general, client computer 40 may be any electronic device or computing system capable of sending and receiving data, and communicating with server 30 over network 20. Client computing device 40 contains energy policy client program 170, application execution function 120, energy policy database 140, compiled code database 160, and application 180. Client computing device may include components, as depicted and described in further detail with respect to FIG. 4.

Application 180 is a generic program or software application. Application 180 may be any program or application that contains an energy policy annotation. An energy policy annotation is an annotation that may be applied to multiple segments of the code. The energy policy annotation indicates to energy policy client program 170, energy policy server program 100, code generation function 110, and/or a compiler that the associated data structure and the data retrieval logic encapsulated within the data structure can be replaced with an alternate implementation based upon the applicable energy policy of the device. In other embodiments, rather than a particular energy policy, the associated data structure and data retrieval logic encapsulated within can be replaced with an alternate implementation based upon a more general data policy of the device, one which is not specifically linked to energy factors. In one embodiment, application 180 resides on client computing device 40. In other embodiments, application 180 may reside on another server, another computing device, or server 30, provided that application 180 is accessible to energy policy client program 170, application execution function 120, energy policy server program 100, and/or code generation function 110.

Energy policies and data policies in general, may dictate how a computing device, such as client computing device 40 should allocate or conserve various computing resources. For example, a device may maintain the following energy policies: high performance, optimized memory, optimized network, and power saver. The high performance energy policy may represent a central processing unit (CPU) intensive policy where premiums are placed on response times. The high performance energy policy may correspond to the fastest response times for requested functions, but it may also consume the most power, as compared to other policies. The optimized memory energy policy may use the smallest possible memory footprint to deliver requested functions. The optimized network energy policy may place a premium on the amount of transmitted and received data. The power saver energy policy may consume the least amount of power, compared to other energy policies, to deliver requested functions. Additional energy policies, data policies and combinations of energy policies and/or data policies are contemplated.

In some embodiments, the active energy policy of the device, such as the active energy policy of client computing device 40, may be manually selected. In other embodiments, the active energy policy of the device may be automatically determined by one or more of the following factors: time of day, ambient temperature, available network bandwidth, available processing bandwidth, current data volume, total power consumption, and other factors. In yet other embodiments, an external server, such as server 30 may maintain the active energy policy for multiple devices, and may send notifications to each device, or alternatively, each device may periodically retrieve the currently active policy.

Energy policy database 140 may be a repository that may be written and read by energy policy server program 100 and/or energy policy client program 170. Energy policies and/or data policies may be stored to energy policy database 140, along with the requirements and rules associated with the policy. For example, a high performance energy policy may dictate intensive use of indexes and memory cache, prefetching data, and fetching related data, while an optimized memory energy policy may dictate computing instead of storing when possible, no data caches, and to never prefetch data. Energy policy database 140 may indicate the active energy policy of client computing device 40. In one embodiment, energy policy database 140 resides on client computing device 40. In other embodiments, energy policy database 140 may reside on another server, another computing device, or server 30, provided that energy policy database 140 is accessible to energy policy server program 100, energy policy client program 170, and/or application execution function 120.

Energy policy server program 100 operates to retrieve alternate data structure classes or other code segments, generate compiled code for each data structure class or code segment, store the alternate compiled code, and otherwise assist in selecting a data structure class or code segment that matches a particular data policy or energy policy. In one embodiment, energy policy server program 100 includes code generation function 110. In one embodiment, energy policy server program 100 resides on server 30. In other embodiments, energy policy server program 100 may reside on another server, another computing device, or client computing device 40, provided that energy policy server program 100 is accessible to energy policy client program 170 code generation function 110, and energy policy client program 120, and provided that energy policy server program 100 has access to application 180, energy policy client program 170, energy policy database 140, data structure database 150, and compiled code database 160.

Code generation function 110 operates to retrieve alternate data structure classes for annotated code segments within an application, wherein the alternate data structure classes are associated with different energy policies than the original data structure class. If alternate data structure classes are found, code generation function 110 may cause a compiler to generate alternate compiled code and store the alternate compiled code for access by application execution function 120. In one embodiment, code generation function 110 may store alternate compiled code segments to compiled code database 160. In some embodiments, code generation function 110 may retrieve alternate data structure classes from a repository of tagged data structure classes and data structure code segments, such as data structure database 150.

A data structure class may be used to represent some data in memory. The data structure class may contain a data structure and data retrieval logic encapsulated within the data structure class. Properties of the data structure class may associate the data structure class with a particular data policy or energy policy.

Data structure database 150 is a repository that may be written and read by energy policy server program 100 and code generation function 110. Alternate data structure classes and code segment sections may be stored to data structure database 150. In some embodiments, data structure database 150 may be written and read by outside programs and entities to populate the database with alternate data structure classes. In one embodiment, data structure database 150 resides on server 30. In other embodiments, data structure database 150 may reside on another server, another computing device, or client computing device 40, provided that data structure database 150 is accessible to energy policy server program 100 and code generation function 110.

Energy policy client program 170 operates to communicate with energy policy server program 100 and select data classes and/or code segments according to device energy policies. In one embodiment, energy policy client program 170 includes application execution function 120. In one embodiment, energy policy client program 170 resides on client computing device 40. In other embodiments, energy policy client program 170 may reside on another server, another computing device, or server 30, provided that energy policy client program 170 is accessible to energy policy server program 100, and application execution function 120, and provided that energy policy client program 170 has access to energy policy database 140, compiled code database 160, and application 180.

Application execution function 120 operates to select data structure classes and code segments that match active data or energy policies of the device initiating execution of the application, such as when client computing device 40 initiates application 180. In some embodiments, application execution function 120 may retrieve previously compiled code segments from a repository, such as compiled code database 160, and select the corresponding version of the code to use, based on the active data policy or energy policy of client computing device 40. In some embodiments, if no version of code exists that complies with the active data policy or energy policy, a different version of code may be selected, that more closely aligns with the rules associated with the active policy relative to the current version of code.

Compiled code database 160 is a repository that may be written and read by energy policy server program 100, code generation function 110, energy policy client program 170, and application execution function 120. Compiled code, as created during the performance of code generation function 110, may be stored to compiled code database 160 for access by application execution function 120. In one embodiment, compiled code database 160 resides on client computing device 40. In other embodiments, compiled code database 160 may reside on another server, another computing device, or server 30, provided that compiled code database 160 is accessible to energy policy server program 100, code generation function 110, energy policy client program 170, and application execution function 120.

Figure 2:
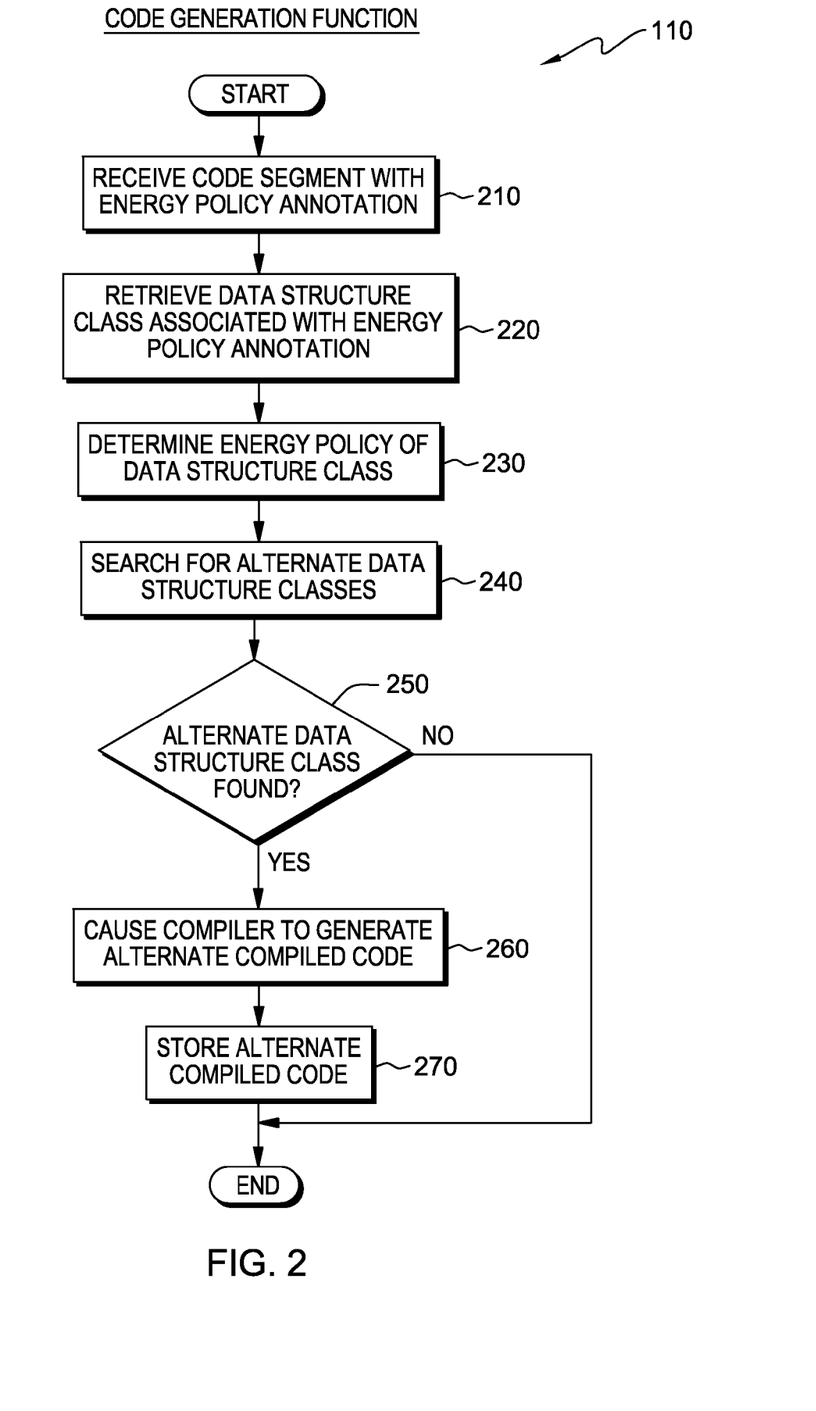
FIG. 2 depicts a flowchart of the steps of a code generation function executing within the computing system of FIG. 1, for receiving annotated code segments, determining alternate code segments that perform a comparable function, and storing the alternate code segments, in accordance with one embodiment of the present invention.

FIG. 2 depicts a flowchart of the steps of code generation function 110, a function of energy policy server program 100, executing within the computing system of FIG. 1, in accordance with an embodiment of the present invention. Code generation function 110 operates to receive one or more data structure classes from the code of an application, such as application 180, that have been annotated with an energy policy annotation and to generate and store alternate compiled code segments for the one or more data structure classes, that correspond to different energy policies, in accordance with one embodiment of the present invention. Code generation function 110 stores alternate compiled code segments to compiled code database 160, for use by application execution function 120, in accordance with one embodiment of the present invention. In one embodiment, code generation function 110 may be an annotation processor capable of processing annotations and modifying code. In one embodiment, the alternate compiled code segments may be flagged with an indicator as to the associated data policy or energy policy.

In one embodiment, initially, a developer may write source code for application 180. Application 180 may be any software or application operating on a computing device, such as client computing device 40. Within the source code of application 180, the developer may insert an annotation indicating that a particular segment of code may be replaced with an alternate implementation of that code, based on the selected data policy or energy policy of the computing device running the application. In some embodiments, the annotation may allow the developer to define conditions under which an alternate implementation of the code is not allowed, such as if the application requires a certain amount of accuracy or particular level of response time. As one example, the following annotation may be applied to multiple segments of code within an application, such as application 180:

```
@EnergyPolicy
DataStructure ds = new DataStructure( );
ds.loadData(key);
```

In the example above, a class "DataStructure" is used to represent a specific data structure class in memory. In this example variable "ds" is an instance of "DataStructure" and is stored in memory. "DataStructure" may contain a data structure and data retrieval logic. Using a "key," network data from a repository is loaded into the structure. The behavior of aspects of the class, such as the data retrieval logic, may place the class within a particular data policy or energy policy, such as the "Optimized Memory" energy policy previously described. However, client computing device 40 may be running according to a different data policy or energy policy, such as the "High Performance" energy policy previously described. As such, "DataStructure" may not be the optimum class for the active energy policy. The annotation "@EnergyPolicy" may indicate that the class "DataStructure" can be replaced with an alternate implementation based on active energy policy of the computing device. In one embodiment, @EnergyPolicy indicates to the compiler and/or code generation function 110 that runtime may replace the data structure and data retrieval logic encapsulated within "DataStructure" with an alternate implementation based on the active energy policy of the device running the application.

In step 210, code generation function 110 receives a code segment from application 180 with an energy policy annotation. The energy policy annotation may be any annotation indicating that the code segment or data structure class may be replaced with an alternate implementation based on the active data policy or energy policy of client computing device 40. In one embodiment, the energy policy annotation may be the annotation "@EnergyPolicy" previously discussed. In one embodiment, code generation function 110 accesses application 180 and retrieves all code segments and data structure classes that include the energy policy annotation.

In step 220, code generation function 110 retrieves the data structure class or code segment that is associated with the energy policy annotation. Code generation function 110 may retrieve the data structure class or code segment by accessing application 180 and locating the data structure class or code segment according to the energy policy annotation in the code. For example, the data structure class may be the class "DataStructure" as previously discussed.

In step 230, code generation function 110 determines the energy policy or energy policies associated with the retrieved data structure class(es) or code segment(s). For example, code generation function 110 may determine that the data structure or code segment falls within any one or more of the previously described energy policies, such as the "High Performance" energy policy, the "Optimized Memory" energy policy, the "Optimized Network" energy policy, the "Power Saver" energy policy, or additional energy or data policies. One skilled in the art may contemplate additional energy and data policies not disclosed herein. Such policies are contemplated by embodiments of the present invention. In one embodiment, code generation function 110 may determine the energy policy associated with the retrieved data structure class(es) or code segment(s) by monitoring the performance of application 180 during runtime and comparing the performance of aspects of application 180 to energy policy information stored to energy policy database 140. In another embodiment, data structure classes or code segments may be tagged with an indicator indicating one or more associated energy policies.

In step 240, code generation function 110 searches a repository for alternate data structure classes or alternate code segments that deliver equivalent functions, but that are associated with different energy policies, as compared to the original data structure class or code segment. Code generation function 110 may search for alternate data structure classes or alternate code segments by searching within a tagged or searchable repository, such as data structure database 150. Data structure database 150 may contain alternate data structure classes or code segments that are tagged according to associated energy policy, and are compatible with application 180. In one embodiment, code generation function 110 may search for at least one alternate data structure class or code segment for each possible energy policy, according to the device on which application 180 resides. In another embodiment, code generation function 110 may search for at least one alternate data structure class or code segment for each energy policy, regardless of the device on which application 180 resides, and code generation function 110 will attempt to find an alternate data structure class or code segment for all possible known energy policies.

In decision 250, code generation function 110 determines whether alternate data structure classes have been found. Code generation function 110 may make this determination based upon the search results resulting from step 240. In an exemplary embodiment, if code generation function 110 finds an alternate data structure class or an alternate code segment that provides a different external interface than the data structure class or code segment used in the code of application 180, then code generation function 110 may prompt a user at server 30 or client computing device 40 for an interface mapper that can bridge from one interface to the other. Code generation function 110 may determine that the external interfaces are different by matching public methods, signatures, and return values.

If code generation function 110 determines that alternate data structure classes have not been found (decision 250, no branch), the function is complete. If there are additional annotated data structure classes or other code segments, code generation function 110 may perform the previous steps with regard to each additional annotated data structure class or other code segment.

If code generation function 110 determines that alternate data structure classes have been found (decision 250, yes branch), code generation function 110 causes a compiler to generate alternate compiled code segments (step 260). Code generation function 110 may cause a compiler to generate an alternate compiled code segment for each of the data structure classes and/or code segments found during the search of step 240. In one embodiment, code generation function 110 may compile at least one data structure class or code segment per existing energy policy.

In step 270, code generation function 110 stores each alternate compiled code segment to a repository for access by application execution function 120. In one embodiment, code generation function 110 may store alternate compiled code segments, along with tags indicating their associated energy policies, to compiled code database 160. Once code generation function 110 has stored all alternate compiled code segments, the function is complete. If there are additional annotated data structure classes or other code segments, code generation function 110 may perform the previous steps with regard to each additional annotated data structure class or other code segment.

Figure 3:
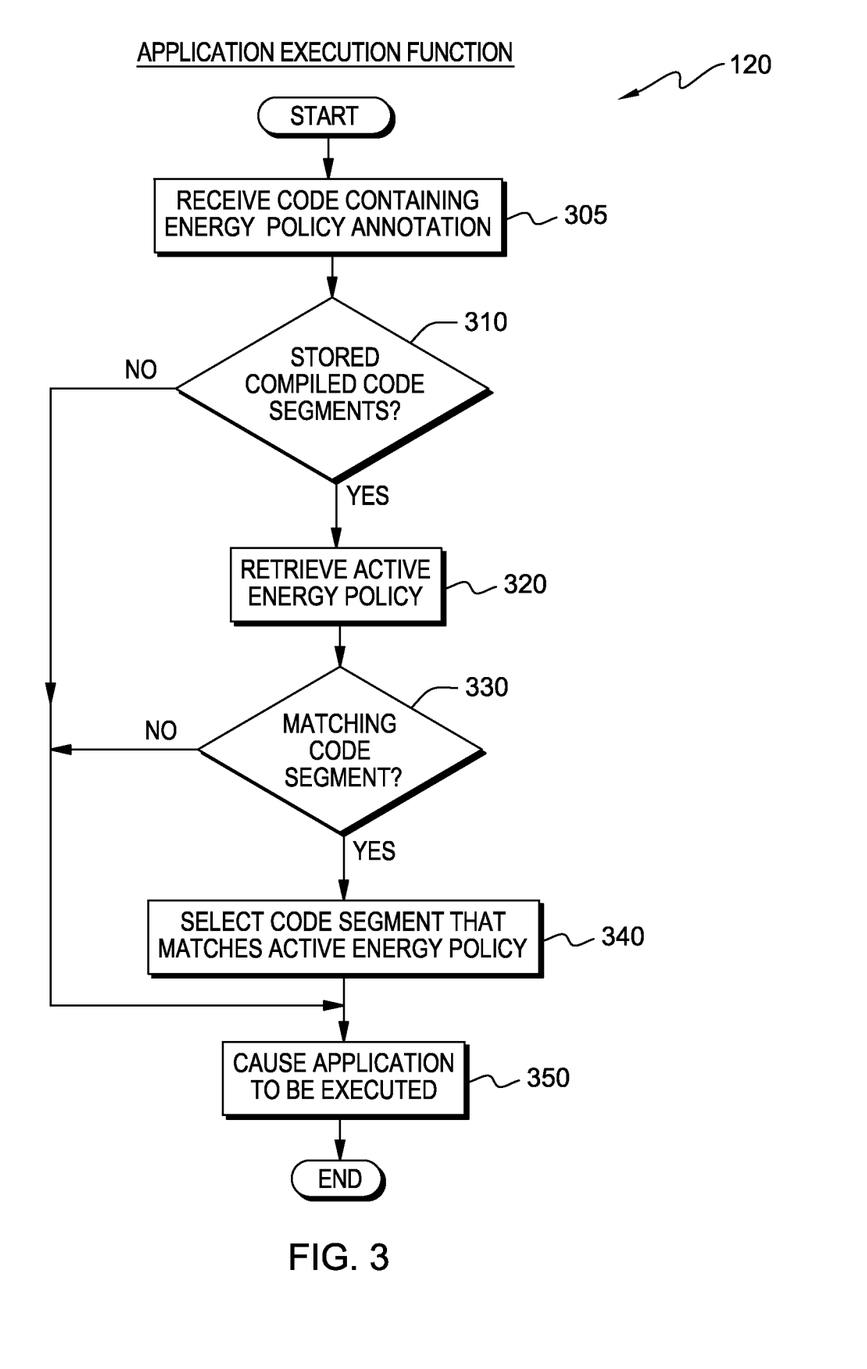
FIG. 3 depicts a flowchart of the steps of an application execution function executing within the computing system of FIG. 1, for selecting a code segment that matches an active data policy of a device and executing an application using the code segment, in accordance with one embodiment of the present invention.

FIG. 3 depicts a flowchart of the steps of application execution function 120, a function of energy policy client program 170, executing within the computing system of FIG. 1. Application execution function 120 operates to select a code segment from a set of stored alternate code segments compatible with the application, based upon the active energy policy of the device running the application, and cause the application to be executed using the selected code segment. In one embodiment, application execution function 120 retrieves alternate code segments from a repository, such as compiled code database 160. In one embodiment, application execution function 120 is a function of the run-time system. A run-time system implements the core behavior of a computer language. In addition to the basic low-level behavior of the language, a runtime system may also implement higher-level behavior.

In one embodiment, initially, code generation function 110 has previously created one or more alternate compiled code segments compatible with application 180, wherein the alternate compiled code segments are associated with different energy policies than the original code segment or data structure class in the original code of application 180. The alternate compiled code segments have been stored to a repository, such as compiled code database 160.

In step 305, application execution function 120 receives code within an application, such as application 180, that is to be executed that contains at least one energy policy annotation. In one embodiment, application execution function 120 scans the source code of application 180 to search for an energy policy annotation.

In decision 310, application execution function 120 determines whether there are stored compiled code segments for the received energy policy annotation. Application execution function 120 may determine that there are other stored compiled code segments by searching compiled code database 160. Compiled code database 160 may contain compiled code segments that have been tagged or contain other indicators indicating the data policy/energy policy of the device, the applicable application, and section of application code to which the compiled code segments correspond.

If application execution function 120 determines there are no stored compiled code segments (decision 310, no branch), application execution function 120 will cause the application to be executed according to the original data structure class or code segment of application 180 (step 350). After application execution function 120 causes the application to be executed, the function is complete.

If application execution function 120 determines there are stored compiled code segments (decision 310, yes branch), application execution function 120 retrieves the active energy policy of client computing device 40 (step 320). In one embodiment, application execution function accesses energy policy database 140 and retrieves the active energy policy according to a flagged indicator that is stored within energy policy database 140 indicating the active energy policy of the device. In another embodiment, application execution function 120 may request the active energy policy from energy policy database 140. In yet another embodiment, an external server, such as server 30, may maintain the active energy policy for multiple computing devices, including client computing device 40. In such an embodiment, application execution function 120 may periodically obtain the currently active policy from server 30, or may alternatively receive a notification when the active policy for client computing device 40 has changed.

In decision 330, application execution function 120 determines whether a stored compiled code segment matches the retrieved active energy policy of client computing device 40. Application execution function 120 may determine if a stored compiled code segment matches the retrieved active energy policy by comparing the retrieved active energy policy to the compiled code segments associated with application 180 and the particular sections of the application 180 code. Compiled code segments may be stored to compiled code database 160, and each compiled code segment may be flagged with an indicator as to the code segment's associated energy policy.

If application execution function 120 determines there is not a match between the active energy policy and one of the stored compiled code segments (decision 330, no branch), application execution function 120 will cause the application to be executed according to the original data structure class or code segment of application 180 (step 350). After application execution function 120 causes the application to be executed, the function is complete.

If application execution function 120 determines there is a match between the active energy policy and one of the stored compiled code segments (decision 330, yes branch), application execution function 120 will select the code segment that matches the active energy policy of client computing device 40 (step 340). For example, application execution function 120 may substitute the original code segment in the source code with one of the stored compiled code segments that matches the active energy policy of client computing device 40. In one embodiment, application execution function 120 is a function of the run-time system and will dynamically select the appropriate code segment prior to executing the application.

In step 350, application execution function 120 causes application 180 to be executed using the code segment selected according to the active energy policy (step 340). In one embodiment, if no such code segment exists, the original code of application 180 may be used during the execution of application 180. In another embodiment, if no code segment has been selected according to the active energy policy, application execution function 120 may select a code segment corresponding to a different policy, but one which more closely aligns with the requirements of the active policy, as compared to the original code of application 180.

Figure 4:
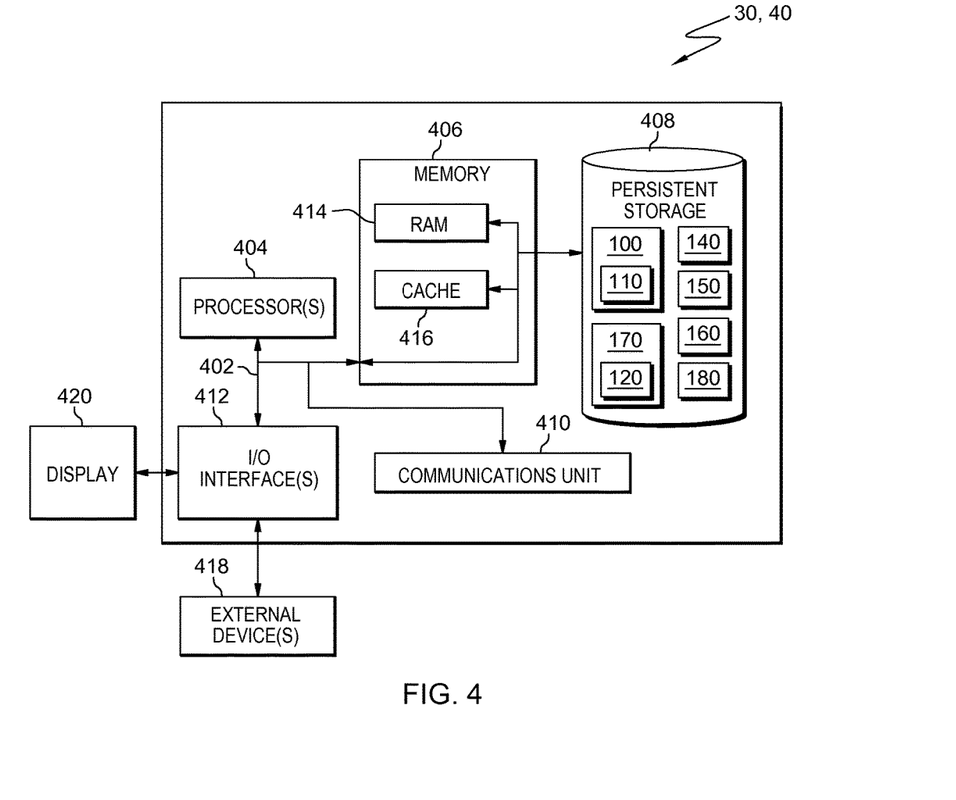
FIG. 4 depicts a block diagram of components of the client computing device and the server in accordance with one embodiment of the present invention.

FIG. 4 depicts a block diagram of components of server 30 and client computing device 40 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 30 and client computing device 40 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Energy policy client program 170, application execution function 120, application 180, energy policy database 140, and compiled code database 160 are stored for execution and/or access by one or more of the respective computer processors 404 of client computing device 40 via one or more memories of memory 406 of client computing device 40. Energy policy server program 100, code generation function 110, and data structure database 150 are stored in persistent storage 408 of server 30 for execution and/or access by one or more of the respective computer processors 404 of server 30 via one or more memories of memory 406 of server 30. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Energy policy client program 170, application execution function 120, and application 180 may be downloaded to persistent storage 408 of client computing device 40 through communications unit 410 of client computing device 40. Energy policy server program 100 and code generation function 110 may be downloaded to persistent storage 408 of server 30 through communications unit 410 of server 30.

I/O interface(s) 412 allows for input and output of data with other devices that may be connected to server computer 30 and client computing device 40. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., energy policy client program 170, application execution function 120, application 180, energy policy database 140, and compiled code database 160, can be stored on such portable computer-readable storage media and can be loaded onto persistent storage 408 of client computing device 40 via I/O interface(s) 412 of client computing device 40. Energy policy server program 100, code generation function 110, and data structure database 150, can be stored on such portable computer-readable storage media and can be loaded onto persistent storage 408 of server 30 via I/O interface(s) 412 of server 30. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for dynamically replacing code within a software application on a device, the method comprising:
   a computer receiving an annotated code segment of a software application of a device that performs a function according to a first data policy, wherein:
   the device is capable of operating according to the first data policy and a second data policy, based upon a selection of a respective data policy received from a user of the device;
   each respective data policy includes a set of requirements associated with the respective data policy;
   the code segment is associated with a first tag indicating that the code segment performs the function according to the first data policy; and
   the annotation indicates that the annotated code segment can be substituted with another code segment, external from code of the software application, if the device is configured to utilize a data policy that is not the first data policy;
   the computer determining an alternate code segment that performs the function according to the second data policy, wherein:
   the alternate code segment is stored in a repository external from code of the software application; and
   the repository contains source code for performing the function according to various data policies;
   the computer causing a compiler to compile the alternate code segment;
   subsequent to the computer determining the alternate code segment, the computer storing the compiled alternate code segment and a second tag in a compiled code database, wherein the second tag indicates that the alternate code segment corresponds to the second data policy;

the computer determining that the device is set to utilize the second data policy; and the computer substituting the annotated code segment with the compiled alternate code segment.

2. The method of claim 1, wherein the first and second data policies are energy policies for data.

3. The method of claim 1, wherein the annotated code segment includes a data structure class, wherein properties of the data structure class associate the data structure class with the first data policy.

4. The method of claim 1, further comprising:
the computer causing the software application to execute using the compiled alternate code segment.

5. The method of claim 1, wherein the computer determining the alternate code segment that performs the function according to the second data policy comprises:
the computer identifying the alternate code segment that performs the function according to the second data policy from the repository based on, at least, the second tag.

6. The method of claim 1, further comprising:
the computer determining that the alternate code segment provides a different external interface than the annotated code segment;
the computer generating a prompt for an interface mapper, wherein the interface mapper is capable of bridging from a first interface of the annotated code segment to a second interface of the alternate code segment;
the computer receiving the interface mapper.

7. The method of claim 1, wherein the computer receiving the annotated code segment of the software application of the device that performs the function according to the first data policy comprises:
the computer comparing performance of the software application during runtime on the device to each set of requirements associated with each of a plurality of data policies, including, at least, the first data policy;
the computer receiving the annotated code segment; and
the computer determining that the annotated code segment performs the function according to the first data policy based on the comparison of the performance of the software during runtime to the set of requirements associated with the first data policy.

8. The method of claim 1, wherein the computer determining an alternate code segment that performs the function according to a second data policy comprises:
the computer determining that no code segment performs the function according to rules of the second data policy; and
the computer determining that the alternate code segment performs the function more closely aligned to the rules associated with the second data policy, as compared to the annotated code segment.

9. The method of claim 1, wherein:
the computer storing the compiled alternate code segment and the second tag comprises the computer storing the compiled alternate code segment to a repository prior to the computer determining that the device is set to utilize the second data policy; and
the computer substituting the annotated code segment with the compiled alternate code segment comprises:
retrieving the compiled alternate code segment from the repository; and
substituting the annotated code segment with the compiled alternate code segment.

10. The method of claim 1, wherein the computer comprises an annotation processor, and the annotation processor is operative to process annotations and modify code.

11. A computer program product for dynamically replacing code within a software application on a device, the computer program product comprising:
one or more computer-readable storage media and program instructions stored on the one or more computer-readable storage media, the program instructions comprising:
program instructions to receive an annotated code segment of a software application of a device that performs a function according to a first data policy, wherein:
the device is capable of operating according to the first data policy and a second data policy, based upon a selection of a respective data policy received from a user of the device;
each respective data policy includes a set of requirements associated with the respective data policy;
the code segment is associated with a first tag indicating that the code segment performs the function according to the first data policy; and
the annotation indicates that the annotated code segment can be substituted with another code segment, external from code of the software application, if the device is configured to utilize a data policy that is not the first data policy;
program instructions to determine an alternate code segment that performs the function according to the second data policy, wherein:
the alternate code segment is stored in a repository external from code of the software application; and
the repository contains source code for performing the function according to various data policies;
program instructions to cause a compiler to compile the alternate code segment;
program instructions to, subsequent to determining the alternate code segment, store the compiled alternate code segment and a second tag in a compiled code database, wherein the second tag indicates that the alternate code segment corresponds to the second data policy;
program instructions to determine that the device is set to utilize the second data policy; and
program instructions to substitute the annotated code segment with the compiled alternate code segment.

12. The computer program product of claim 11, wherein the first and second data policies are energy policies for data.

13. The computer program product of claim 11, wherein the annotated code segment includes a data structure class, wherein properties of the data structure class associate the data structure class with the first data policy.

14. The computer program product of claim 11, further comprising:
program instructions to cause the software application to execute using the compiled alternate code segment.

15. A computer system for dynamically replacing code within a software application on a device, the computer system comprising:
one or more computer processors, one or more computer-readable storage media, and program instructions stored on the computer-readable storage media for execution by at least one of the one or more processors, the program instructions comprising:

program instructions to receive an annotated code segment of a software application of a device that performs a function according to a first data policy, wherein:
the device is capable of operating according to the first data policy and a second data policy, based upon a selection of a respective data policy received from a user of the device;
each respective data policy includes a set of requirements associated with the respective data policy;
the code segment is associated with a first tag indicating that the code segment performs the function according to the first data policy; and
the annotation indicates that the annotated code segment can be substituted with another code segment, external from code of the software application, if the device is configured to utilize a data policy that is not the first data policy;
program instructions to determine an alternate code segment that performs the function according to the second data policy, wherein:
the alternate code segment is stored in a repository external from code of the software application; and
the repository contains source code for performing the function according to various data policies;
program instructions to cause a compiler to compile the alternate code segment;
program instructions to, subsequent to determining the alternate code segment, store the compiled alternate code segment and a second tag in a compiled code database, wherein the second tag indicates that the alternate code segment corresponds to the second data policy;
program instructions to determine that the device is set to utilize the second data policy; and
program instructions to substitute the annotated code segment with the compiled alternate code segment.

16. The computer system of claim 15, wherein the first and second data policies are energy policies for data.

17. The computer system of claim 15, wherein the annotated code segment includes a data structure class, wherein properties of the data structure class associate the data structure class with the first data policy.

18. The computer system of claim 15, further comprising:
program instructions to cause the software application to execute using the compiled alternate code segment.

\* \* \* \* \*